Dec. 29, 1953   E. J. HOUDRY   2,664,340
CATALYTIC APPARATUS AND METHOD FOR
TREATING EXHAUST GASES
Filed Aug. 9, 1949   2 Sheets-Sheet 1

INVENTOR.
EUGENE J. HOUDRY
BY
ATTORNEYS.

Dec. 29, 1953    E. J. HOUDRY    2,664,340
CATALYTIC APPARATUS AND METHOD FOR
TREATING EXHAUST GASES
Filed Aug. 9, 1949    2 Sheets-Sheet 2
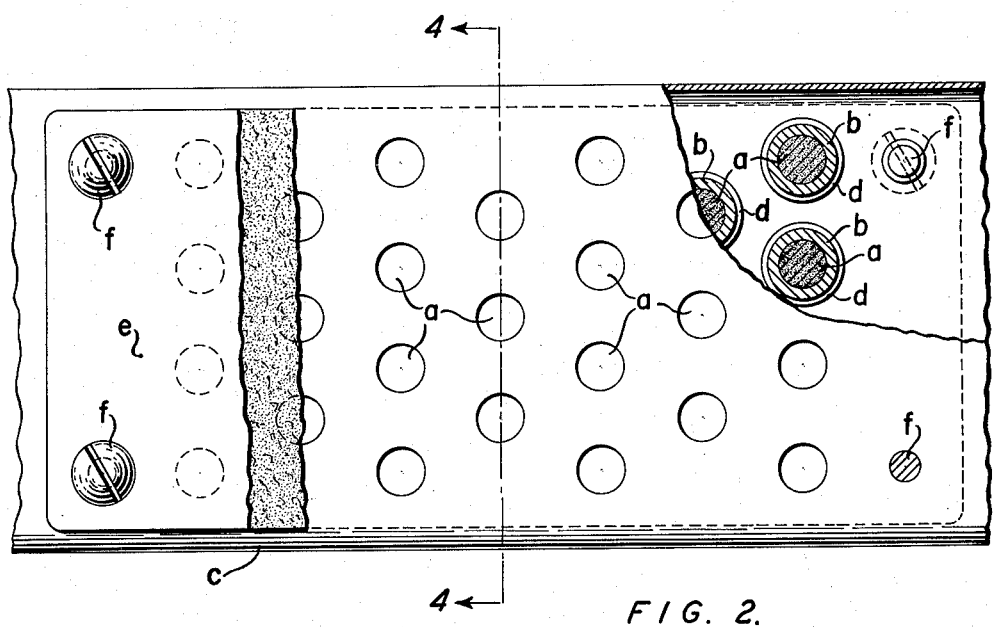
FIG. 2.
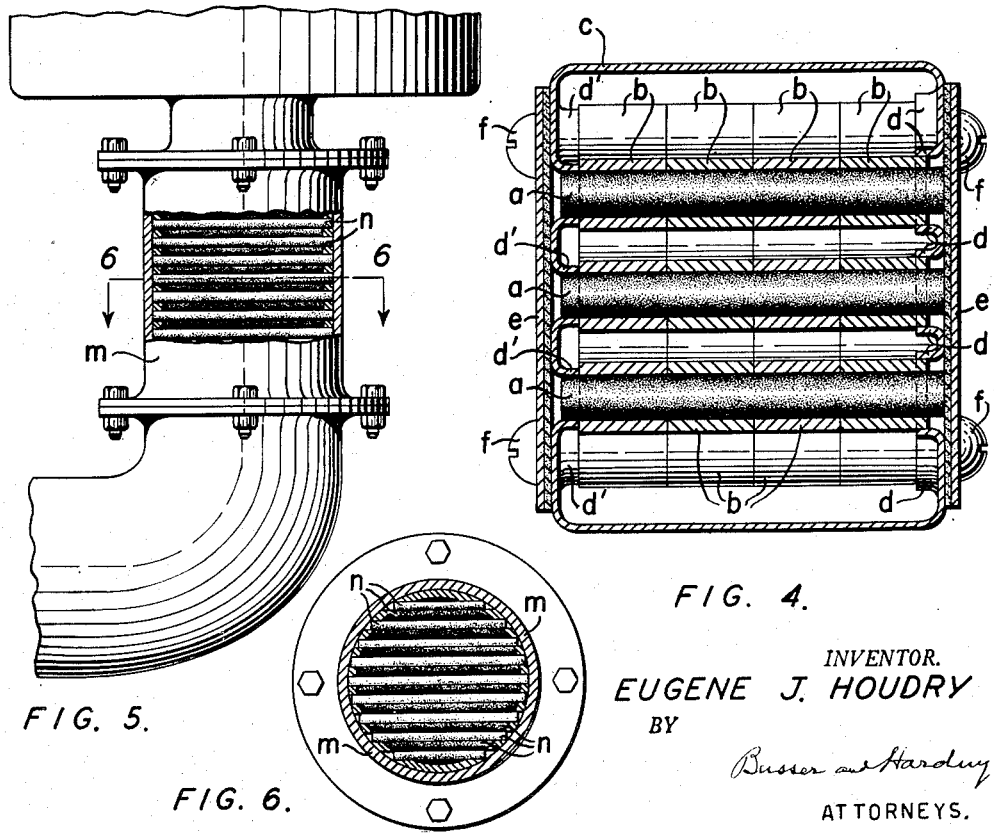
FIG. 4.
FIG. 5.
FIG. 6.
INVENTOR.
EUGENE J. HOUDRY
BY
Busser and Harding
ATTORNEYS.

Patented Dec. 29, 1953

2,664,340

UNITED STATES PATENT OFFICE 2,664,340

CATALYTIC APPARATUS AND METHOD FOR TREATING EXHAUST GASES

Eugene J. Houdry, Ardmore, Pa.

Application August 9, 1949, Serial No. 109,288

6 Claims. (Cl. 23—2)

Under running conditions of internal combustion engines, whether of the spark ignition or auto ignition type, the exhaust gases contain large amounts of poisons and obnoxious fumes. Automobile spark ignition engines run on air-fuel mixtures varying from lean to rich, according to speed and traffic conditions. When the engine runs on lean mixture, the amount of oxidizable material contained in the exhaust gas is small, but when the engine performs in traffic conditions and mostly on rich mixture, the amount of oxidizable material is great. In urban locations, especially where traffic is dense, which necessitates frequent stoppages, the carbon monoxide, a deadly poison, contained in the exhaust gas of an automobile averages 4.5 per cent. by volume and at certain times reaches 9.0 per cent., the average automobile under these conditions releasing to the atmosphere approximately six pounds per hour of carbon monoxide. As small an amount as 0.1 per cent. of carbon monoxide is dangerous to life, while mere traces of carbon monoxide in the air cause disagreeable and injurious physical conditions, such as headache and dizziness.

In order to render these obnoxious and dangerous fumes harmless, and particularly to convert the carbon monoxide to carbon dioxide or otherwise eliminate it, many expedients have been proposed and patented, including the use of catalysts. Theoretically, the problem is simple. This is because a great number of catalysts perform the reaction. By simply placing one of these catalysts on the exhaust line the exhaust fumes are cleaned, but due to various defects none shows possibilities of successful commercialization. None of these catalytic processes provides for the inconstancy of the factors incident to the reaction. Throughput, chemical composition and temperature of the stream vary constantly over a wide range.

Throughput varies from one to 20.

Carbon monoxide content in the exhaust gases varies from 9.0 to 0.4 per cent., hydrogen varies from 4.0 per cent. to traces; there are encountered also other changes due to excess lubrication, failure of spark plugs, worn piston rings, and to drivers using the engine as a brake while switching off the ignition system.

Temperatures of exhaust gas streams at the end of the engine exhaust manifold in commercial cars are in the following ranges:

| | ° F. |
|---|---|
| Engine idle | 450 |
| 30 M. P. H | 770 |
| 40 M. P. H | 880 |
| 50 M. P. H | 1100 |

To solve this problem economically and simply, it is preferred to bring the catalyst to oxidation temperature by the exhaust gases when starting the engine.

To maintain the reaction when the engine is idle and also for quick starting, it is obvious that catalysts should be close to the exhaust manifold end, and more so when it is considered that 40 to 50 per cent. by volume of fresh air must be added to the exhaust fumes at "starting point" (this term is hereinafter defined) so as to provide the oxygen necessary for complete oxidation of the fumes. Consequently the following temperatures are obtained in the blend of exhaust fumes and fresh air, when using only one venturi for fresh air admission.

| | |
|---|---|
| Engine idle | 325° F. |
| 30 M. P. H | 600° F. |
| 40 M. P. H | 700° F. to 800° F. |
| 50 M. P. H | 850° F. to 1000° F. |

When engines run idle combustion efficiency corresponds very often to an air-fuel ratio of 11:1 and the incomplete combustion of the air-fuel mixture under these conditions leaves 7.3 per cent. carbon monoxide and 3.4 per cent. hydrogen in the exhaust gas. The oxidation of such percentages of carbon monoxide and hydrogen liberates enough B. t. u. to raise the temperature of the exhaust gases by 1800° F.

If it be assumed that a car is progressing on the highway at a speed of 45 miles per hour, the temperature of the catalyst installed near the exhaust manifold end is close to the temperature of the exhaust gases plus fresh air (for there is little to oxidize) and is of the order of 900° F.–1000° F. When such a car stops suddenly at a red light, with motor idling, temperatures of exhaust gases plus fresh air fall rapidly, but heat stored in the catalyst and in the steel supporting it plays an important role. In fact, I have obtained under those conditions temperature as high as 2200° F. Such temperature destroyed the activity of the catalyst mentioned above and made a problem of the steel structure.

The problem presented by those conditions was a serious one. It was apparent that the catalysts had to be controlled and temperature limits determined. There being no constant factor in the reaction, it became obvious that only a "starting point" corresponding to critical conditions of reaction and operation would permit a practical solution. This point corresponds to the longest amount of oxidizable products contained in the exhaust gases, and in all cases has been found above but close to idle range of the engine.

Another problem that has not been solved is that of the catalytic structure and composition. So far as the catalyst is efficient, its efficiency has been of limited duration.

For example, when using metal grid supports for the catalyst, they rapidly distort and corrode on account of excessive variations of high temperatures. Further, the active catalyst coated on the metal separates from the grid and falls in the catalytic container or is carried away by the exhaust gases.

When using material in granular form, the attrition, due to the vibration and shocks which make the pellets roll over one another, entails a large consumption of catalyst. Also breakage of the pellets or of the containers occurs due to the extremely variable temperature of the catalytic mass, which causes expansion and contraction of the container.

In tests made on modern cars, using a single catalytic mass composed of pellets, the oxidizable components of the exhaust gas were completely removed, but at the outlet of the catalytic mass temperatures in excess of 2000° F. were obtained at frequent intervals. This temperature was found too high for commercial catalyst life and good mechanical behavior of the catalytic exhaust system. In the apparatus used the catalyst container was placed at an angle and a small reservoir containing extra catalyst was placed on top of the catalyst container so that the extra catalyst would flow by gravity and keep the container filled. It was found that the losses after each stopping and consequent cooling down of the engine were consistent, the average being 1.07 cubic inches of catalyst. This would require that the catalyst in pellet form would have to be replaced every week for average driving of passenger cars.

The catalyst structure and composition which I have found satisfactory both as to operativeness and long life is one comprising three different components:

First, a solid support, inert chemically under operating conditions toward the active catalyst metals, and resistant to temperature shocks, as can be obtained when using material similar to that used in spark plug manufacture. Second, an active stable oxide, such as alumina, deposited on the support. Third, a finely divided metal such as platinum, silver, or copper, impregnating the alumina base. Platinum, silver and copper, in contact with exhaust gases under operating conditions, combine with oxygen to form unstable oxides which liberate monomolecular oxygen capable of performing the oxidation reaction.

The support above mentioned is of porcelain chemically inert under operating conditions toward the active metal. By "porcelain" I do not mean to include porcelain containing free silica, since with such porcelain carrying an alumina film or base impregnated with platinum, the catalyst becomes inactive after a few hours of operation. If, for any reason, such as economy, or resistance to mechanical shock, this type of porcelain should be used, it is necessary to saturate fully the porcelain support with an excess of alumina until the free silica is completely combined.

The construction and arrangement of catalysts embodying my invention will be clear from the drawings, in which:

Fig. 2 is a plan view, partly in section, of a complete catalytic unit.

Fig. 3 is a diagrammatic view disclosing a series of catalytic units; the arrangement being especially adapted to application to internal combustion engines of the spark plug ignition type.

Fig. 4 is a section on the line 4—4 of Fig. 2.

Fig. 5 is a view partly in section showing the application of a catalytic unit to a diesel engine.

Fig. 6 is a section on the line 6—6 of Fig. 5.

Figure 1:
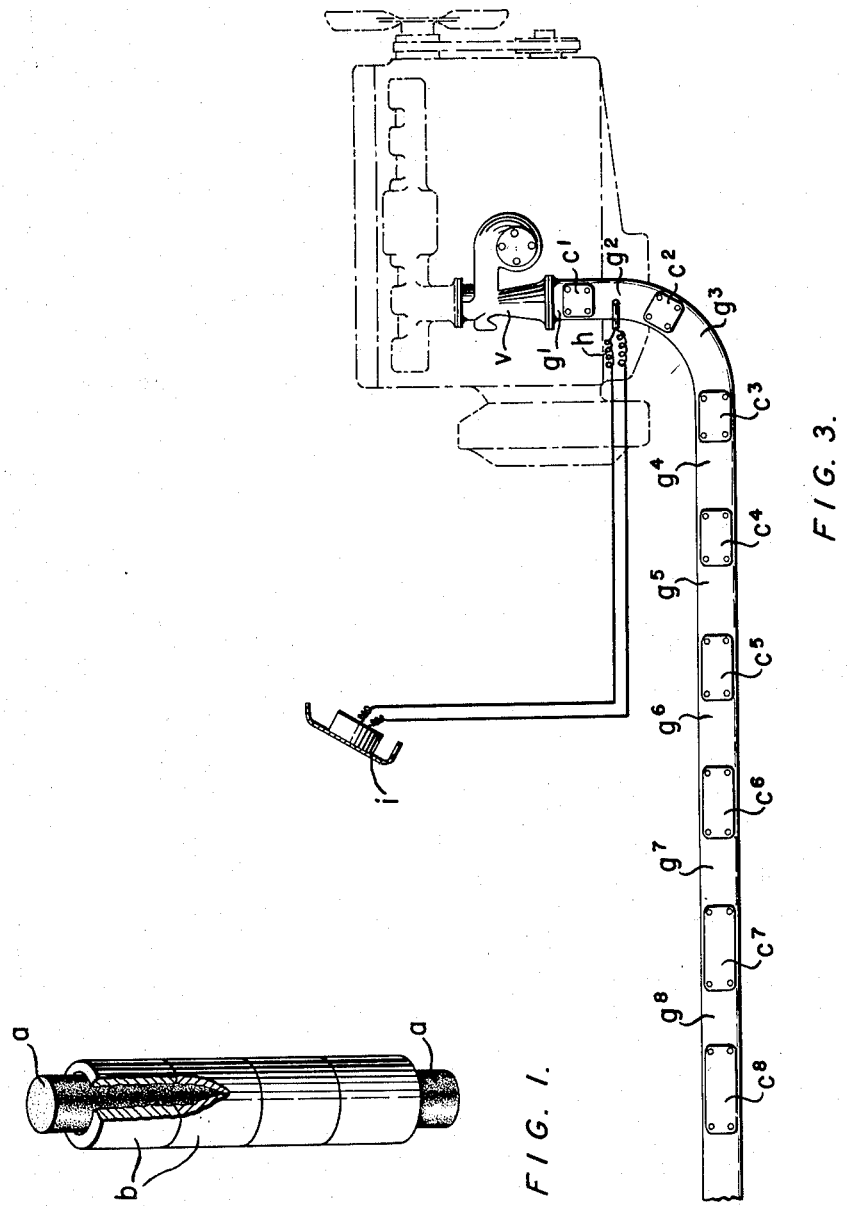
Fig. 1 is a perspective view of one of the elements of a catalytic unit.

In Fig. 1 is illustrated a catalytic element of the character of that hereinbefore described, $a$ being a rod of porcelain upon which is sleeved a tube or cylinder $b$ of active alumina, over the surface of which is dispersed the finely divided metal catalyst. The porcelain support is not an essential part of the element so far as concerns the performance of the catalyzing function, but some mechanical support for the alumina is desirable, if not necessary, especially as it is impracticable to make the alumina cylinders in one piece of the desired length. I therefore make the cylinder in sections (four are shown in Fig. 1) and slip them over the porcelain rod.

A multiplicity of these elements are then mounted in a container $c$, shown in Figs. 2 and 4. The container is provided in its opposite side walls with a number of directly opposite holes surrounded by inwardly extending annular flanges. The hole enclosed by a flange $d$ at one side of the container is of a diameter adapted to receive the catalytic element $a$—$b$. The hole enclosed by the immediately opposite flange $d'$ at the other side of the container is of a diameter adapted to receive the end of the supporting rod $a$ which projects beyond the cylinder $b$. The element $a$—$b$ is inserted into the larger holes in one side of the container until the end of base $b$ abuts against the annular flange $d'$ at the other side of the container. Plates $e$ are then applied to the side walls of the container and secured thereto by screws $f$, thereby holding the elements $a$—$b$ in place.

These elements may be arranged in the container in different ways, but it is preferred to stagger them as shown; that is, a row of four elements, then a row of three elements, then a row of four elements, then a row of three elements, and so on.

I prefer also to arbitrarily divide the elements into "zones," the first two rows constituting one zone, the next four rows constituting a second zone, and the remainder of the rows constituting a third zone. The number of such rows and the number of elements in each row may be varied. For example, the number of rows in the third zone preferably exceeds the number of rows in each of the first and second zones. It is of decided advantage to disperse platinum on the seven elements constituting the first zone, silver on the fourteen elements constituting the second zone, and copper on the elements constituting the third zone. As the exhaust gas progresses through the catalytic unit its temperature progressively increases. At a lower temperature platinum is the most efficient active metal catalyst, and indeed is efficient at all temperatures. At a higher temperature silver is more efficient than copper, but copper is as efficient as platinum or silver at a still higher temperature. The distribution of the active metal catalysts as described, with a predominance of the copper catalyst, effects substantial economy without sacrifice of efficiency.

For the active alumina it is possible to substitute magnesia, beryllia or thoria. For the platinum may be substituted ruthenium, palladium or iridium. For the silver may be substituted silver-chromium. For the copper may be substituted copper-chromium or copper-manganese.

As a typical example of temperature conditions, and assuming a low speed not far from the idle range of the engine, the temperature of the gases entering the first—platinum catalyst—zone of the unit of Fig. 2 would be about 550° F., the temperature at the entrance to the second—silver catalyst—zone would be about 850° F., and the temperature at the entrance to the third—copper catalyst—zone would be about 950° F. While the catalysts specified would perform well up to a temperature of the order of 1500° F., it is preferred, in order to secure long catalyst life, to keep the maximum temperature outlet of each zone below 1200° F. The maximum temperature may be controlled most conveniently by limiting the length of the container $c$ and consequently the length of the path of travel through the unit.

If the percentage of carbon monoxide in the exhaust gases is small, the passage of the exhaust gases through a single unit will reduce all the carbon monoxide to carbon dioxide; but since, in spark ignition engines, the content of carbon monoxide varies from 0.4% to 9.0%, and since, when a large proportion of carbon monoxide is present in the exhaust gases, all of it cannot be reduced to carbon dioxide in a single unit, it is necessary to provide a series of these units, separated one from another by pipe sections wherein the heat produced in one unit is largely dissipated before the admission of the gases to the next unit of the series, thereby introducing the gases to all the units at not greatly different temperatures. One long unit is impracticable, since the heat stored in the catalyst elements and in the steel container supporting them would raise the temperature to a degree that would destroy the activity of the catalyst and warp the steel container. It is sufficient to provide only three of these units, but the pipes separating any two more nearly adjacent units would have to be of great length; that is, of a length adequate to effect cooling of the order of 500° to 600° F. I prefer, therefore, to employ a greater number of units, say eight. Cooling between zones need therefore be only of the order of about 200° F. When employing a relatively large number of units in series, the total length of pipes is much less than when using a smaller number of units and the total weight of steel necessary is therefore substantially lower.

In Fig. 3 the catalytic units are lettered $c^1$ to $c^8$ inclusive, each similar to that shown in Fig. 2 and hereinbefore described, while $g^1$ to $g^8$ are the gas-cooling pipes, one, $g^1$, positioned before the first catalytic unit $c^1$ and the others separating one catalytic unit from another. $v$ is a venturi for fresh air admission. The size and length of the pipes $g^1$ to $g^8$ are so determined that when the engine is running at "starting point" (this term has been defined hereinbefore) the heat produced in each catalytic unit is dissipated to the atmosphere. Consequently the temperature variation in each catalytic zone due to carbon monoxide, hydrogen and hydrocarbon fumes, is limited, as above stated, to about 200° F.

Thus each catalytic unit is so adjusted in surface and activity as to effect the oxidation of only a fraction of the complex oxidizable material contained in the exhaust fumes. The catalytic surface in each unit is determined by test on the engine to which the units are applied.

It is preferable, but unnecessary, to provide fresh air by using more than one venturi. Thus another venturi may be installed between two catalytic units, thus permitting a flexibility in the oxygen content in the exhaust fumes—fresh air mixture and easier control of the extent of oxidation reaction.

Another advantage of the use of a considerable number of catalyst units in series is that it permits limitation in the number of platinum catalyst elements. Thus all the catalyst units need not contain the three catalytic zones—platinum, silver and copper. Indeed it is practicable to provide only the unit $c'$ with a platinum zone, the temperature of the exhaust gases entering subsequent units being sufficiently high to maintain the reaction with units having silver and copper catalyst zones. In fact, great latitude is permissible in the provision of the zones of the different metal catalysts in the different units. As a guide to the arrangement and disposition of the different catalytic zones, it may be stated that copper and silver are excellent catalysts for the described type of catalytic reaction if the temperature is maintained above 800° F., while the performance of platinum is better and may be maintained at a temperature of the order of 550° F.

Another important discovery for commercial success has been the desirability of establishing catalytic zones having the same intensity of reaction. The oxidation catalysts hereinbefore mentioned oxidize preferably hydrogen and hydrocarbon fumes rather than carbon monoxide. In order to obtain the same intensity of reaction, each unit should have a different catalytic surface, an excellent proportion of surfaces for the eight units in series being: units 1 and 2 equal; units 3 and 4 fifty per cent greater than unit 1; units 5 and 6 double unit 1; units 7 and 8 two and one-half times unit 1. Such a catalytic apparatus is then operated on the engine under all variable conditions of speed, power and traffic, and control is made that maximum temperature outlet of each unit is of the order of 1200° F. Final adjustment is easily obtained by placing the proper number of catalyst elements in each unit.

All catalysts mentioned above can operate safely in reducing atmosphere, and for a long period, at temperature as high as 1500° F. Consequently, in proceeding as described in the specification, a simple, safe operation of exhaust gas cleaning is obtained at low cost.

In resumé, using several units of the same intensity of reaction has permitted setting the maximum temperature of each unit between 1100 and 1200° F. while cooling the exhaust gases between units by proper dimensioning of the pipe containing the catalyst and proper spacing apart of the more nearly adjacent catalytic units. In so proceeding, there is removed approximately 75 per cent of the heat produced under extreme conditions [corresponding to starting point] by cooling the exhaust gases between units, using the exhaust pipe as a heat exchanger, the remaining 25 per cent being removed by the exhaust gases themselves at the end of the last catalytic unit.

Another advantage of the design of catalytic units shown and described is that it provides free space through which the exhaust gases flow, the free space being determined so that pressure drop occurring during the oxidation reaction is between one and two inches of water. I have found that excellent results are obtained when the surface of free space transversal to the flow of exhaust gases and added air is between 3.0 and 4.5 square inches per 100 cubic inches of engine piston displacement. Under those conditions, when the engine is running idle or at a speed where the temperature of exhaust gases and fresh air entering the catalyst is below initial oxidation temperature of the first catalytic unit, the reaction is maintained in this unit by heat exchange and radiation between the flow of gases and the catalysts.

The apparatus shown in Figure 3 has the advantage of abating greatly the noise of the exhaust, thereby rendering unnecessary the actual muffler, or making it possible to construct it of a simple design and at low cost.

Survey of pressure drop in exhaust pipe of commercial cars has revealed the following figures:

Idle, ⅛" of water
20 miles normal, 2" of water
30 miles normal, 3" of water
35 miles normal, 6" of water
40 miles normal, 12" of water
60 miles normal, 24" of water
20 miles second gear, steep hill, 24" of water
30 miles average hill, 18" of water
Acceleration at 40 miles, 72" of water The maximum pressure drop under the same conditions using the apparatus embodying my invention and a simplified muffler does not exceed 5" of water.

As mentioned above, drivers often use the engine as a brake while switching off the ignition. In this case the catalyst effects the combustion of the gasoline contained in the fuel-air mixture. In order to insure the safety of the apparatus, the surface of the catalyst should be limited to 1.5 square inches of platinum catalyst surface per cubic inch of piston displacement. When using a combination of platinum, silver and copper catalyst this limit may be increased, for the reason that silver and copper are not as active as platinum. If these proportions are not respected, then, when drivers use the engine as a brake, the catalysts may attain temperatures that destroy their activity and the apparatus itself.

We have found it interesting and simple to install a thermo-couple $h$, shown in Figure 3, connected to a galvanometer $i$ placed on the dashboard which indicates whether extraordinary conditions exist in the engine, such as poor carburetion, spark plug failure, or worn piston rings. This device may give also an indication of good, fair or poor driving.

I have explained why it is necessary, in the adaptation of the invention to internal combustion engines of the spark ignition type, to provide a plurality of catalytic units. The arrangement that I have described is a series arrangement, but it is practicable, and in fact desirable in the adaptation of the invention to engines of large size, to arrange the catalytic units in parallel and also, preferably, to utilize a catalytic element which, although it comprises a porcelain support, an active alumina base and dispersed on the latter a finely divided metal catalyst, is of a different specific construction, desirably that disclosed in an application filed by me May 24, 1949, Serial No. 95,031, now abandoned. A preferred method of making this catalytic element is set forth in the patent to Malina No. 2,580,806, dated January 1, 1952. The described parallel arrangement of catalyst units is the subject matter of a separate application filed May 5, 1950, Serial No. 160,180, and is not herein specifically claimed.

In one adaptation of my invention, namely to internal combustion engines of the diesel type, the arrangement of a number of catalytic units in series or in parallel is not necessary. Such application of the invention is shown in Figs. 5 and 6, in which $m$ is the engine exhaust pipe in which are arranged a number of catalytic elements $n$ of the construction shown in Fig. 1. These elements span the interior of the exhaust pipe (or the interior of a container interposed in the exhaust pipe). The zonal arrangement of these elements $n$ may be substantially the same as their arrangement in container $c$; that is, platinum in a first zone, silver in a second zone, and copper in a third zone. Instead of constructing the catalytic unit as shown in Fig. 1, it may have the construction disclosed in my said abandoned application Serial No. 95,031, in which the active stable oxide, such as alumina, applied to the support, comprises, not a cylinder, or a number of cylinder sections, of alumina, slipped onto a solid supporting rod of porcelain or equivalent chemically inert support, as shown in Fig. 1, but a film of a weight very small as compared with the weight of the porcelain support, the latter having a convenient contour. A unit of this construction may be substituted for that shown in Fig. 1, whether only one catalyst unit is used, as in Fig. 5, or whether a number of catalyst units are employed and arranged in series, as shown in Fig. 3, or in parallel as described in the immediately preceding paragraph.

The reason why a single catalytic unit is all that is required to convert CO to $CO_2$ in an internal combustion engine of the auto-ignition or diesel type is that the gases discharged rarely contain more than about 0.4% CO, all of which is reducible to $CO_2$ after the gases have traversed a comparatively short path of catalyst-bearing elements. However, the percentage of atmospheric air in the waste gases is so very great that the amount of CO discharged from such an engine in a given time under idle or running conditions is substantially in excess of the amount discharged from an engine of the spark-ignition type; and the problem of avoiding pollution of the atmosphere by waste gases from engines of the auto-ignition type is one that presses for a satisfactory solution. My invention affords such a solution. Even in diesel engines it may be of decided advantage to flow the exhaust gases in parallel through a number of catalyst units, as disclosed in my said application filed May 5, 1950, Serial No. 160,180; and even the flow of exhaust gases from engines of the diesel type in series through two or more catalyst units is not without the scope of my invention.

I do not herein claim broadly the herein described catalytic structure and composition comprising a porcelain support having substantially no catalytic activity, a base of active alumina deposited on the support and a finely divided catalyst of metal or metal oxide carried by the base, this being the subject matter of my application, hereinbefore referred to, No. 95,031, filed May 24, 1949, and now abandoned, a preferred method of making which is disclosed in the patent to Malina No. 2,580,806. But said application and patent do not specifically disclose a support of this character shaped as a rod on which is sleeved a tube of active alumina. However, the principal or generic subject-matter of the present application is the arrangement of a multiplicity of catalytic structures as first above defined in a chamber communicating with the exhaust of an internal combustion engine, based on the discovery that said catalytic structure, in contact with the exhaust gases under operating conditions, will be effective to convert carbon monoxide to carbon dioxide and discharge such gases into the atmosphere free of poisonous and obnoxious fumes. As utilized in such a combination, the specific embodiment of the described catalytic structure shown in Figs. 1, 2 and 4 has some advantages and may be found applicable to other uses than as a purifier of the exhaust gases from internal combustion engines.

What is claimed is:

1. The combination with the exhaust of an internal combustion engine, of a catalyst chamber communicating therewith and with the atmosphere, and a multiplicity of groups of catalytic elements fixedly contained in said chamber, the groups being arranged in series, the elements of each group comprising a base of active alumina and dispersed thereon a finely divided metal catalyst, the group nearest the exhaust comprising a number of separate spaced-apart elements in which the finely divided metal catalyst is platinum, a succeeding group comprising a number of spaced-apart elements in which the finely divided metal catalyst is silver, and a group succeeding the last named group comprising a number of spaced-apart elements in which the finely divided metal catalyst is copper.

2. The construction defined in claim 1 in which the number of elements in the second specified group exceeds the number of elements in the first specified group and in which the number of elements in the third specified group exceeds the number of elements in the second specified group.

3. The combination with the exhaust of an internal combustion engine, of a catalyst chamber communicating therewith and with the atmosphere, and a multiplicity of catalytic elements fixedly contained in said chamber each of which comprises a supporting rod of porcelain, a cylinder composed of a number of cylindrical sections of active alumina sleeved thereon, the combined length of which is less than the length of the rod, and dispersed on the outer surface of the cylindrical sections a finely divided metal catalyst; pairs of inwardly extending annular flanges, located on opposite walls of the chamber and forming opposite orifices, opposite ends of each rod extending within said annular flanges into opposite orifices and thus extending crosswise of the direction of flow of the gases, and plates secured to the outside of said orificed walls, thereby holding said catalyst elements fixedly within the chamber.

4. The process of purifying the gases exhausted from an internal combustion engine which comprises passing the gases over a multiplicity of catalytically active alumina base elements having dispersed thereon finely divided metal catalyst, at least the first elements having platinum as the finely divided catalyst, later elements having silver as the finely divided catalyst, and still later elements having copper as the finely divided catalyst, the elements being so proportioned and arranged as to produce a rise in temperature in the exhaust gases passed thereover to the required extent to make the catalysts active, the elements having platinum thereon raising the exhaust gases to about 850° F. and the elements having silver thereon further raising the temperature of the exhaust gases to about 950° F.

5. Process as set forth in claim 4 in which heat is removed from the exhaust gases at intermediate points between catalytic elements to prevent overheating of later catalytic elements.

6. The combination with the exhaust of an internal combustion engine, of a channel communicating at one end with the exhaust and at the other end with the atmosphere, said channel being divided into a series of sections comprising catalytic units, not lower in number than three, alternating with gas-cooling passages, each catalytic unit comprising a chamber and a multitude of spaced apart catalytic elements fixedly contained therein, each of said elements comprising a support of catalytically inactive refractory material to which is applied a catalytically active base on which is dispersed a finely divided metal catalyst, the combined area of all the base catalyst surfaces of each unit being varied relative to the areas of the catalyst surfaces of other units; the unit or units nearest the exhaust having a smaller catalytic surface area, the unit or units nearest the discharge to atmosphere having a substantially greater catalytic surface and the intermediate unit or units having an area greater than the first mentioned unit or units and smaller than the second mentioned unit or units.

EUGENE J. HOUDRY.

References Cited in the file of this patent

UNITED STATES PATENTS

| Number | Name | Date |
| --- | --- | --- |
| 1,043,580 | Eldred | Nov. 5, 1912 |
| 1,595,711 | Cornelier | Aug. 10, 1926 |
| 1,605,484 | Thompson et al. | Nov. 2, 1926 |
| 1,793,813 | Mac Kinnon | Feb. 25, 1931 |
| 1,867,325 | Neville | July 12, 1932 |
| 1,919,626 | Finn | July 25, 1933 |
| 2,106,910 | Finn, Jr. | Feb. 1, 1939 |
| 2,288,943 | Eastman | July 7, 1943 |
| 2,475,155 | Rosenblatt | July 5, 1949 |

FOREIGN PATENTS

| Number | Country | Date |
| --- | --- | --- |
| 411,377 | Great Britain | June 7, 1942 |
| 411,655 | Great Britain | June 14, 1934 |
| 413,967 | Great Britain | July 26, 1934 |
| 312,200 | Great Britain | July 7, 1942 |